US012725465B2

(12) United States Patent
Moir et al.

(10) Patent No.: US 12,725,465 B2
(45) Date of Patent: Sep. 1, 2026

(54) VEHICLE INSPECTION SYSTEM AND METHOD

(71) Applicant: Transportation IP Holdings, LLC, Norwalk, CT (US)

(72) Inventors: Lindsay Moir, Erie, PA (US); Chirag Bipinchandra Parikh, Forth Worth, TX (US); Tyler Yost, Erie, PA (US); Margaret Ilorieuse Dieudonne, Erie, PA (US); Mike Beyerlein, Erie, PA (US); Naren Dhass, Bangalore (IN); David Eugene Dukes, Erie, PA (US); Shankar Chandrasekaran, Erie, PA (US); Harold Hostettler, Erie, PA (US); Scott Zarella, Erie, PA (US); Rajeev Verma, Bangalore (IN); Prasanth Sunkara, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 83 days.

(21) Appl. No.: 18/980,722

(22) Filed: Dec. 13, 2024

(65) Prior Publication Data

US 2025/0201037 A1 Jun. 19, 2025

Related U.S. Application Data

(60) Provisional application No. 63/609,706, filed on Dec. 13, 2023.

(51) Int. Cl.
*G07C 5/08* (2006.01)

(52) U.S. Cl.
CPC .................................... *G07C 5/08* (2013.01)

(58) Field of Classification Search
CPC ...... G07C 5/08; G07C 5/0808; G07C 5/0816; G07C 5/085; G07C 5/006; G01R 31/005; G01R 31/59; G01R 31/12
See application file for complete search history.

(56) References Cited

U.S. PATENT DOCUMENTS 7,116,109 B2 * 10/2006 Klang .................. G01R 31/379
324/426
7,363,129 B1 * 4/2008 Barnicle ................ G08C 17/02
701/1

(Continued)

FOREIGN PATENT DOCUMENTS

CN 101516704 A * 8/2009 .............. F02N 11/08
CN 114562401 A * 5/2022 ............ F02P 19/023

(Continued)

*Primary Examiner* — Babar Sarwar
(74) *Attorney, Agent, or Firm* — K&L Gates LLP

(57) ABSTRACT

A control system and method of performing an inspection event on a vehicle includes identifying a type of energy used to power one or more components of the vehicle; and from plural different test preset settings, selecting at least one selected setting based at least in part on the type of energy that is identified. One or more control settings of the vehicle are changed based on the at least one selected setting to energize at least one component of a propulsion system of the vehicle at a first level of energization. One or more first characteristics of one or more systems of the vehicle are obtained responsive to the energizing of the at least one component at the first level of energization. A condition or operating readiness level of the vehicle is determined based at least in part on the one or more first characteristics.

24 Claims, 6 Drawing Sheets

200

(56) References Cited

U.S. PATENT DOCUMENTS

| | | | | |
|---|---|---|---|---|
| 9,349,223 | B1 * | 5/2016 | Palmer | H04L 67/12 |
| 9,571,623 | B2 * | 2/2017 | Schultz | H04W 4/16 |
| 9,979,814 | B2 * | 5/2018 | Xuan | H04W 4/027 |
| 10,434,883 | B2 * | 10/2019 | Berels | B60L 1/00 |
| 10,807,606 | B2 * | 10/2020 | Yang | B62D 15/021 |
| 10,836,260 | B2 * | 11/2020 | Moriya | B60L 53/37 |
| 10,967,869 | B2 * | 4/2021 | Kimura | B60W 40/06 |
| 11,148,678 | B2 * | 10/2021 | Lin | B60W 10/18 |
| 11,233,672 | B2 * | 1/2022 | Rutherford | H04L 12/40013 |
| 11,551,488 | B2 * | 1/2023 | Sankavaram | G06N 5/01 |
| 11,580,800 | B2 * | 2/2023 | Ghosh | G07C 5/008 |
| 11,941,923 | B2 * | 3/2024 | Jung | G06N 3/042 |
| 12,037,015 | B2 * | 7/2024 | Xiang | B60W 50/0205 |
| 12,151,686 | B2 * | 11/2024 | Yamaoka | B60W 40/09 |
| 12,293,617 | B2 * | 5/2025 | Nistler | G07C 5/006 |
| 12,345,022 | B2 * | 7/2025 | Koga | E02F 9/261 |
| 12,576,841 | B2 * | 3/2026 | Liu | B60W 30/146 |
| 2006/0163939 | A1 * | 7/2006 | Kuramochi | B60T 8/885 303/122.04 |
| 2010/0305812 | A1 * | 12/2010 | Nagao | G07C 5/085 701/33.4 |
| 2012/0245766 | A1 * | 9/2012 | Cooper | B61L 15/0027 701/99 |
| 2013/0158838 | A1 * | 6/2013 | Yorke | B60W 10/115 701/123 |
| 2014/0169398 | A1 * | 6/2014 | Arndt | G01K 15/007 374/100 |
| 2014/0310186 | A1 * | 10/2014 | Ricci | G06F 16/951 705/302 |
| 2015/0307107 | A1 * | 10/2015 | Tamari | G07C 5/0808 701/32.4 |
| 2017/0080883 | A1 * | 3/2017 | Yasunori | H02J 7/855 |
| 2017/0178425 | A1 * | 6/2017 | Ohno | G07C 5/008 |
| 2018/0086210 | A1 * | 3/2018 | Berels | B60L 1/00 |
| 2018/0158335 | A1 * | 6/2018 | Gee | B60Q 5/008 |
| 2018/0227306 | A1 * | 8/2018 | Borkowicz | H04L 63/0227 |
| 2019/0199129 | A1 * | 6/2019 | Kobayashi | H02J 13/14 |
| 2020/0346634 | A1 * | 11/2020 | Holz | B60W 20/40 |
| 2020/0394850 | A1 * | 12/2020 | Sankavaram | G07C 5/008 |
| 2023/0103895 | A1 * | 4/2023 | Fujioka | B60L 3/0023 701/29.2 |
| 2023/0213568 | A1 * | 7/2023 | Hobbs | G01R 31/2829 340/431 |
| 2023/0373457 | A1 * | 11/2023 | Snyder | B60T 17/221 |
| 2024/0399891 | A1 * | 12/2024 | Bartels | B60L 7/006 |

FOREIGN PATENT DOCUMENTS

| | | | | |
|---|---|---|---|---|
| DE | 69813482 | T2 * | 2/2004 | B60T 13/741 |
| DE | 102017101510 | A1 * | 8/2017 | G07C 5/08 |
| DE | 102021124394 | A1 * | 10/2022 | G05B 23/0262 |
| EP | 0698522 | A1 * | 2/1996 | B60K 6/46 |
| EP | 4614764 | A1 * | 9/2025 | B60L 3/0023 |
| KR | 0128356 | Y1 * | 12/1998 | G01R 31/006 |
| KR | 101499093 | B1 * | 6/2015 | G07C 5/08 |
| KR | 101835344 | B1 * | 4/2018 | B60W 40/09 |
| WO | WO-2017217259 | A1 * | 12/2017 | B60L 53/66 |

* cited by examiner

VEHICLE INSPECTION SYSTEM AND METHOD

CROSS-REFERENCE TO RELATED APPLICATION

This application claims benefit under 35 U.S.C. § 119 (e) to U.S. Provisional Application No. 63/609,706, filed Dec. 13, 2023, entitled VEHICLE INSPECTION SYSTEM AND METHOD, the entire disclosures of which are hereby incorporated by reference herein.

BACKGROUND

Technical Field

The subject matter described herein relates to vehicle inspection systems and methods for controlling the vehicle during inspection events of a vehicle.

Discussion of Art

Before a powered system is used in operation, one or more components and/or systems of the powered system may need to be checked and/or inspected. The inspection of the powered system components may provide information associated with a level of readiness of the powered system being ready to be used in operation, an indication of a component that may need attention, maintenance, and/or repair before being used in operation, or the like.

As one example, before a vehicle embarks on a trip, the vehicle may be subject to one or more tests and/or checks in order to determine a condition and/or level of readiness of the vehicle. For example, before a propulsion-generating rail vehicle can be included in a vehicle consist, the propulsion systems, brake systems, thermal systems, or the like, of the rail vehicle may need to be checked. The propulsion system may need to be inspected to ensure that the rail vehicle has a required engine horsepower capability. Optionally, the engine cooling systems and components may need to be verified that engine temperatures can be controlled while the rail vehicle is in operating.

These outbound tests, however, are time consuming events, require operator control of the various systems needing to be inspected (e.g., manual throttle notch control, manual cooling fan control, etc.), and often times require manual monitoring of the overall inspection event. It may be desirable to have a system and method that differs from those that are currently available.

BRIEF DESCRIPTION

In accordance with one example or aspect, a method of performing an inspection event on a vehicle includes identifying a type of energy used to power one or more components of the vehicle; and from plural different test preset settings, selecting at least one selected setting based at least in part on the type of energy that is identified. One or more control settings of the vehicle can be changed based on the at least one selected setting to energize at least one component of a propulsion system of the vehicle at a first level of energization. One or more first characteristics of one or more systems of the vehicle are obtained responsive to the energizing of the at least one component at the first level of energization. A condition or operating readiness level of the vehicle is determined based at least in part on the one or more first characteristics.

In accordance with one example or aspect, a control system performs an inspection event on a vehicle. The control system includes a controller having one or more processors that identify a type of energy used to power one or more components of a vehicle. The controller selects at least one selected setting from among plural test preset settings based at least in part on the type of energy that is identified. The controller changes one or more control settings of the vehicle based on the at least one selected setting to energize at least one propulsion system component of a propulsion system of the vehicle at a first level of energization. The controller obtains one or more first characteristics of one or more systems in response to the energizing of the at least one propulsion system component at the first level of energization. The controller determines a condition or operating readiness level of the vehicle based at least in part on the one or more first characteristics.

In accordance with one example or aspect, a method includes identifying a type of energy used to power one or more components of a vehicle. From among plural test preset settings, at least one selected setting is selected based at least in part on the type of energy that is identified. One or more control settings of the vehicle are changed based on the at least one selected setting to energize at least one propulsion system component of a propulsion system of the vehicle to a first level of energization. An engine temperature of an engine of the vehicle is obtained in response to energizing the at least one propulsion system component. The engine temperature is determined to be below a determined threshold. The one or more control settings of the vehicle are changed to energize the at least one propulsion system component to a second level of energization until the engine temperature reaches the determined threshold responsive to determining that the engine temperature is below the determined threshold. The propulsion system is operated at a first propulsion setting responsive to the engine temperature reaching the determined threshold. The propulsion system operates at the first propulsion setting for a first length of time. One or more characteristics of one or more systems of the vehicle are obtained during operation of the propulsion system at the first propulsion setting. A condition or an operating readiness level of the vehicle is determined based at least in part on the one or more characteristics.

BRIEF DESCRIPTION OF THE DRAWINGS

The subject matter may be understood from reading the following description of non-limiting embodiments, with reference to the attached drawings, wherein below.

DETAILED DESCRIPTION

Figure 1:
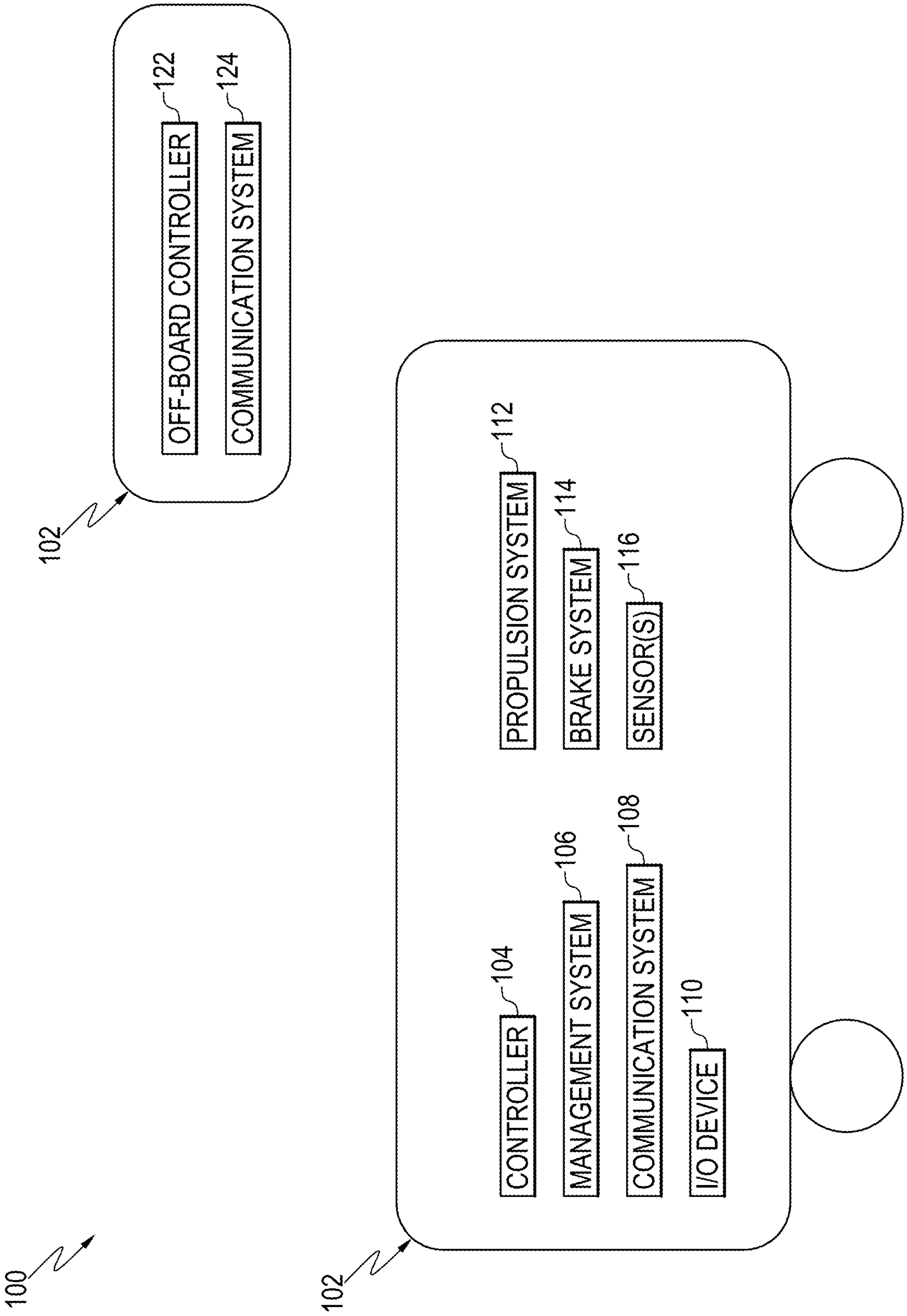
FIG. 1 illustrates a schematic of a vehicle inspection control system, in accordance with one example.

Embodiments of the subject matter described herein relate to vehicle inspection systems and methods that control operation of a vehicle during an inspection event. The inspection event may occur prior to a vehicle leaving on a trip. For example, the inspection event may be referred to as an automated self-load outboard test. In one or more embodiments, one or more steps of the inspection event may be automatically controlled and/or conducted by a controller of the vehicle. During the inspection event, one or more components of a propulsion system of the vehicle (e.g., one or more propulsion system components) may be energized to different levels of energization. Characteristics of components and/or systems of the vehicle may be obtained, such as by one or more sensors, while the components of the propulsion system are energized at the different levels. The controller may determine a condition of the vehicle and/or an operating readiness level of the vehicle based at least in part on the sensed characteristics. In one or more embodiments, the operating readiness level may indicate a level of confidence that the vehicle is prepared and ready to be used, such as during the trip.

In one or more embodiments, the controller may control one or more thermal management components of a thermal management system of the vehicle during the inspection event. For example, the controller may control one or more thermal management components (e.g., fans, blowers, fluid characteristics via valves, etc.) and the sensors may detect thermal characteristics of the vehicle, fluids of the vehicle, the engine, or the like. The controller may determine a condition of the thermal management system of the vehicle based at least in part on the sensed thermal characteristics. In one or more embodiments, the operating readiness level of the vehicle may be based at least in part on the condition of the thermal management system and at least in part on the condition of the vehicle components associated with the energization of the propulsion system of the vehicle. For example, a state of health of the vehicle may be determined based at least in part on the determined conditions of the propulsion systems and/or thermal systems of the vehicle.

Suitable powered systems may be mobile and/or stationary powered systems. Examples of mobile powered system may include vehicle systems, rail vehicles, automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy). Examples of stationary powered systems may include industrial power systems, wind or other turbines, electronics cooling, renewable energy systems, water treatment facilities, any domestic or commercial cooling systems, personal appliances or other systems, or the like. The mobile and/or stationary powered system may be subject to an inspection event prior to operation of the powered system.

FIG. 1 illustrates one example of a vehicle inspection system 100 in accordance with one embodiment. The vehicle inspection control system includes a vehicle 102 that may be subject to an inspection event. The vehicle may be required to complete an inspection event prior to the vehicle embarking on a trip, subsequent to the vehicle completing a trip (such as before the vehicle is moved to a vehicle yard or shed to wait for future trips), or the like. In one or more embodiments, the vehicle may complete at least a portion of the inspection event during the trip. The inspection event may inspect, test, evaluate, or the like, one or more systems of the vehicle. Results of the inspection event may be examined and/or evaluated to confirm if the vehicle (and one or more systems and/or components of the vehicle) require maintenance, if the systems and/or components are in an acceptable state, or the like.

The vehicle may be a propulsion-generating vehicle, and may include a controller 104 that represents hardware circuitry that may include and/or may be connected with one or more processors that may control operation of the vehicle control system as described herein. The processors may include microprocessors, microcontrollers, integrated circuits, field programmable gate arrays, or other logic devices that operate based on instructions stored on a tangible and non-transitory computer readable storage medium, such as software applications stored on a memory or database. In one embodiment, the controller can represent a vehicle controller or vehicle control unit. In one or more embodiments, the vehicle control system may include one or more input and/or output devices (e.g., control panel, switch, keyboard, microphone, touch screen, speaker, or the like), that allow an operator of the vehicle to control one or more operations of the vehicle controller, to communicate with the vehicle controller, to receive information (e.g., about the vehicle) from the vehicle control unit, or the like. The controller may include a single processor or multiple processors. All operations can be performed by each processor, or each processor may perform at least one different operation than one or more (or all) other processors). The processors may be in the same or different locations (such as by being disposed within or part of different devices).

The vehicle may include a brake system 114. The brake system can represent one or more of friction brakes, air brakes, dynamic brakes (e.g., one or more of the traction motors of the propulsion system that also can generate braking effort via dynamic braking), or the like. In one or more embodiments, energy generated by the brake system via dynamic braking may be directed to the energy storage device where the energy may be stored for use within other systems of the vehicle system, or may be directed to a resistor grid (such as if the battery is at full capacity or the electrical generation is at a c-rate higher than desirable for a battery). The vehicle may include an input/output device 110 ("I/O Device" in FIG. 1), such as a touchscreen, keyboard, electronic mouse, electronic display other than a touchscreen, switch, lever, button, speaker, microphone, etc., used to present information to and/or receive information from operators of the powered system.

The vehicle may include a propulsion system 112 that can represent one or more components that are powered to propel the powered system or vehicle system, such as motors. Optionally, the propulsion system can include an engine and/or alternator or generator that operates to separately provide electric energy to power loads of the powered system (e.g., the motors). In one or more embodiments, the propulsion system may be operably coupled with one or more energy storage devices (not shown) that may provide power to one or more components of the propulsion system. Optionally, the propulsion system may generate power that may be directed to and stored within the one or more energy storage devices. Suitable energy storage devices may store energy that may be used to power auxiliary and/or non-auxiliary loads of the vehicle system. In one or more embodiments, the auxiliary loads can be powered by the energy storage devices and/or the propulsion system to perform work that does not propel the vehicle system. For example, the auxiliary loads can include display devices, monitoring devices (e.g., sensors), or the like.

In one or more embodiments, the vehicle and/or the vehicle system may be powered by one or more different fuel and/or energy types. With respect to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included. Optionally, the vehicle and/or vehicle system may be powered by electric energy (e.g., direct and/or alternating current). One or more energy sources may provide the electric energy to one or more loads, and the energy sources may include one or more fuel cells.

The vehicle may include a management system 106 that represents hardware circuitry including and/or connected with one or more processors that calculate and/or dictate operational settings of the vehicle system. This circuitry and/or the processors may be the same as or separate from (e.g., in addition to) the circuitry and/or processors of the controller. The management system may calculate settings to achieve one or more goals of the vehicle system subject to various constraints. As one example, the management system can determine a trip plan that dictates operational settings of the vehicle system at different locations, different times, different distances, etc., of upcoming travel of the vehicle system. These operational settings can cause the vehicle system to travel within the constraints (e.g., speed limits, forces exerted on the vehicle and/or the route, remaining a safe distance from other vehicles or objects, or the like) while driving the vehicle system toward achievement of the goal(s) (e.g., reducing fuel consumption, battery energy consumption, emission generation, reduce audible noise, etc.) relative to the vehicle system traveling within the constraints but using other settings. The operational settings can be throttle settings, brake settings, speeds, or the like.

The devices of the vehicle may be communicatively coupled with each other by a communication system 108. The communication system can be formed from communication pathways provided by or extending in conductive pathways (e.g., cables, buses, etc., such as Ethernet cables or connections) and/or wireless pathways. Some devices may be publisher devices or publishers that generate output. Some devices may be listener devices or listeners that obtain or receive the output from the publishers to perform some operation (e.g., control of the powered system, calculation of output, etc.). Some devices may be both publishers and listeners that receive data from another device, make a calculation, determination, etc. based on the received data, and generate data as an output for another device and/or perform some action (e.g., change operation of the powered system, such as changing a speed, throttle setting, etc., of a vehicle).

In one or more embodiments, the vehicle may include a memory or alternative data storage system (not shown). For example, a memory can store information about the vehicle, about different vehicles of the vehicle system, the route, historical trip information (e.g., information associated with how the vehicle system was automatically and/or manually controlled during previous trips along the route), historical trip information of other vehicle systems (e.g., information associated with how another vehicle system automatically and/or manually controlled during previous trips along the same route and/or along different routes), or the like. Optionally, the vehicle may receive data stored in a data storage device or memory of the off-board control system (not shown), data stored in another storage system (e.g., a cloud storage database and/or other virtual storage systems), or the like.

In one or more embodiments, the vehicle inspection control system may include an off-board control system 120 that may be communicatively coupled with the communication system of the vehicle. In one or more embodiments, the off-board control system may include an off-board controller 122 that represents hardware circuitry connected with and/or including one or more processors that perform the operations described herein in connection with the control system. The off-board control system may represent a dispatch facility, such as a back-office server, a data center, or the like. The off-board control system may include a communication system 124 that allows direct and/or indirect communication between the vehicle and the off-board control system. The off-board control system may communicate directly with one or more vehicles of the vehicle system, with each propulsion-generating vehicle of the vehicle system, with a lead vehicle of the vehicle system (that may then relay communicated messages between the non-lead vehicles of the vehicle system and the off-board control system), or any combination therein.

In one embodiment, the controller or control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller or control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates if the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

The vehicle may include one or more sensors 116 that monitor, sense, or otherwise detect mechanical and/or electrical characteristics of the systems and/or components of the vehicle, of the route along which the vehicle moves, ambient conditions of the environment in which the vehicle is disposed, or the like. In one or more embodiments, the sensors may be and/or include a thermometer or other thermal sensing device, a speed sensor, an acoustic sensor (e.g., an ultrasonic sensor), a capacitive sensor, a photoelectric sensor, an inductive sensor, a laser distance sensor, an ohmmeter, a voltmeter, an impedance analyzer, or any combination therein.

In one or more embodiments, one or more of the sensors may be transferably coupled with the vehicle during an inspection event. For example, one or more sensors may be separate from the vehicle, and may be coupled with the vehicle during the inspection event, may be coupled with the vehicle at a location proximate to a system and/or component being inspected, or the like. The sensors transferably coupled with the vehicle may be communicatively coupled with the onboard controller and/or the off-board controller such that the sensors may communicate at least some of the sensed data with the onboard and/or off-board controller. Optionally, the sensors may communicate at least some of the data with a memory (not shown) that may store some of the sensed data obtained during the inspection event.

In one or more examples, the one or more transferable sensors may sense one or more characteristics of components and/or systems of the vehicle, and the one or more non-transferable sensors (e.g., sensors that are not transferably coupled with the vehicle) may sensor one or more different characteristics of the components and/or systems of the vehicle. For example, the transferable sensors may be capable of sensing characteristics of the components and/or systems of the vehicle that the non-transferable sensors are not capable of sensing, or vice versa. Optionally, the transferable sensors and the non-transferable sensors may sense or detect the same, substantially the same, or common characteristics and the sensed data obtained by the transferable sensors may be compared with the sensed data obtained by the non-transferable sensors to determine a condition of the systems and/or components of the vehicle.

Figure 2:
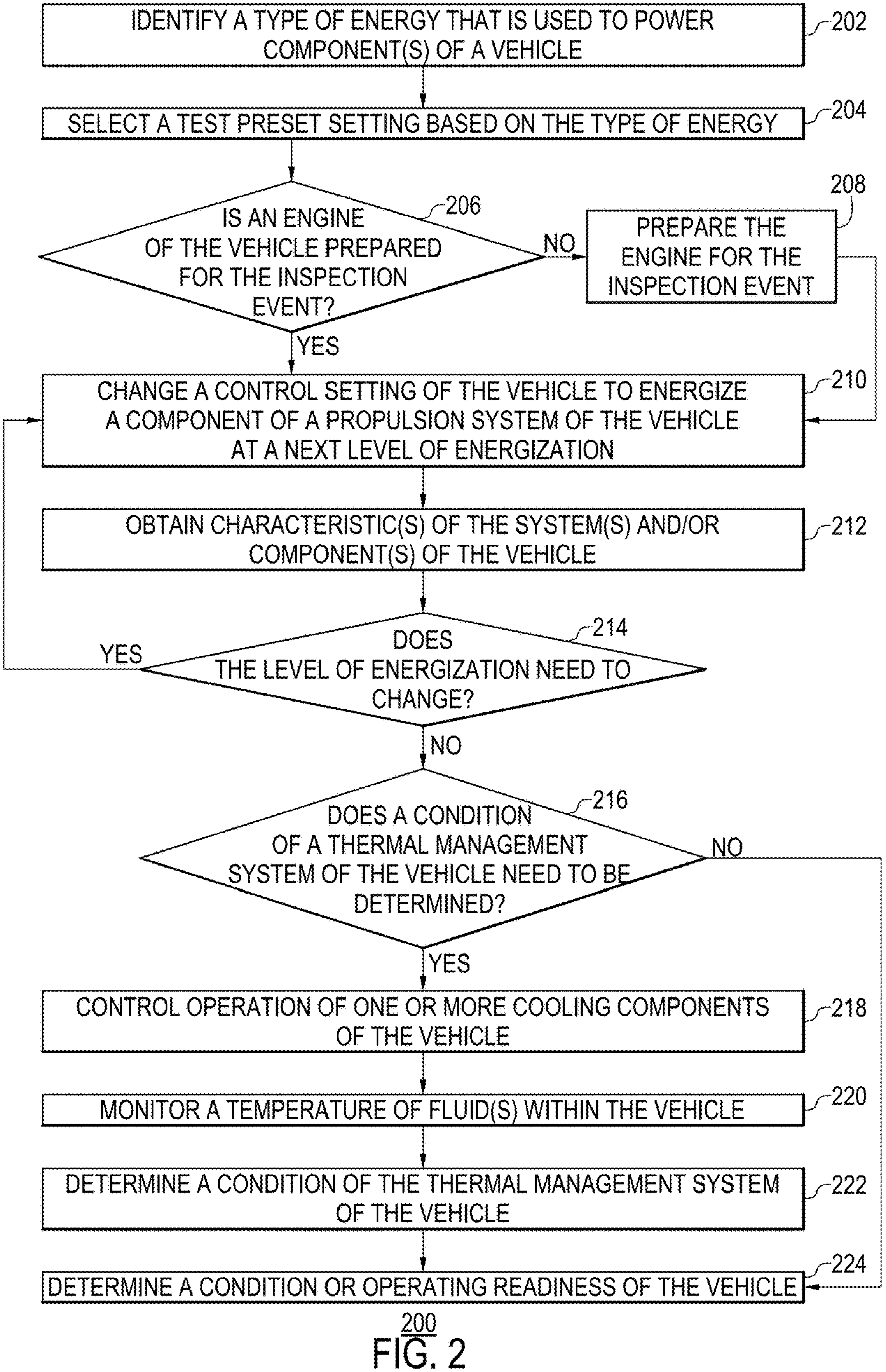
FIG. 2 illustrates a flowchart of a method of performing an inspection event on a vehicle, in accordance with one embodiment.

FIG. 2 illustrates a flowchart 200 of a method of performing an inspection event on a vehicle, in accordance with one embodiment. The vehicle may be required to complete the inspection event prior to the vehicle embarking on a trip, subsequent to the vehicle completing a trip (such as before the vehicle is moved to a vehicle yard or shed to wait for future trips), subsequent to the vehicle completion a portion of the trip, during the trip, or the like. The inspection event may inspect, test, evaluate, or the like, one or more systems and/or components of the vehicle. Results of the inspection event may be examined and/or evaluated to determine if the vehicle (and one or more systems and/or components of the vehicle) require maintenance, if the systems and/or components are in an acceptable state, an operating readiness level of the vehicle (e.g., if the vehicle and/or the systems or components are prepared to embark on a trip, prepared to complete a trip, or the like), or the like.

At step 202, a type of energy that is used to power one or more components and/or one or more systems of the vehicle is identified. In one or more embodiments, the steps associated with the inspection event may be based at least in part on the type of energy that is used to power the vehicle. In one or more embodiments, different systems and/or different components of the vehicle may be powered by different types of energy. The different types of energy that is used to power the different systems and/or components may be identified. In one or more embodiments, the energy may be fuel or electric energy. With respect to fuel, the fuel may be diesel, gasoline, kerosene, dimethyl ether (DME), alcohol, natural gas (methane) or a short chain hydrocarbon, hydrogen, ammonia, and the like. With respect to electric energy, the components and/or systems may be powered by alternating current (AC) and/or direct current (DC).

At step 204, one or more test preset settings are selected from plural different test preset settings. The test preset setting(s) may be selected based at least in part on the type of energy that is identified, the type of components and/or systems that are being inspected, the type of energy that powers the components and/or systems that are being inspected, the type of vehicle that is being inspected, the number of vehicles operably connected as a vehicle system with the vehicle, the components and/or systems of the vehicle that will be inspected during the inspection event, based on expected operating conditions of the vehicle during an upcoming trip (e.g., propulsion settings and/or brake settings that the vehicle will experience during the trip), based on historical operating conditions that the vehicle (or similar vehicles) experienced during previous travel along a route, based on operating settings and/or conditions that one or more components and/or systems are designed to achieve (e.g., maximum speed settings a propulsion system is designed to reach, maximum brake pipe pressure levels, or the like), or the like.

Optionally, the selected test preset setting(s) may be selected based at least in part on a scheduled time of departure of the vehicle. For example, one or more test preset setting(s) may require a length of time to complete the inspection event but the vehicle may be scheduled to depart on a trip before the inspection event with the selected test preset settings is completed. Therefore, one or more other test preset settings may need to be selected. For example, the one or more test preset settings may be selected based on an amount of time the vehicle has to complete the inspection event.

Figure 3:
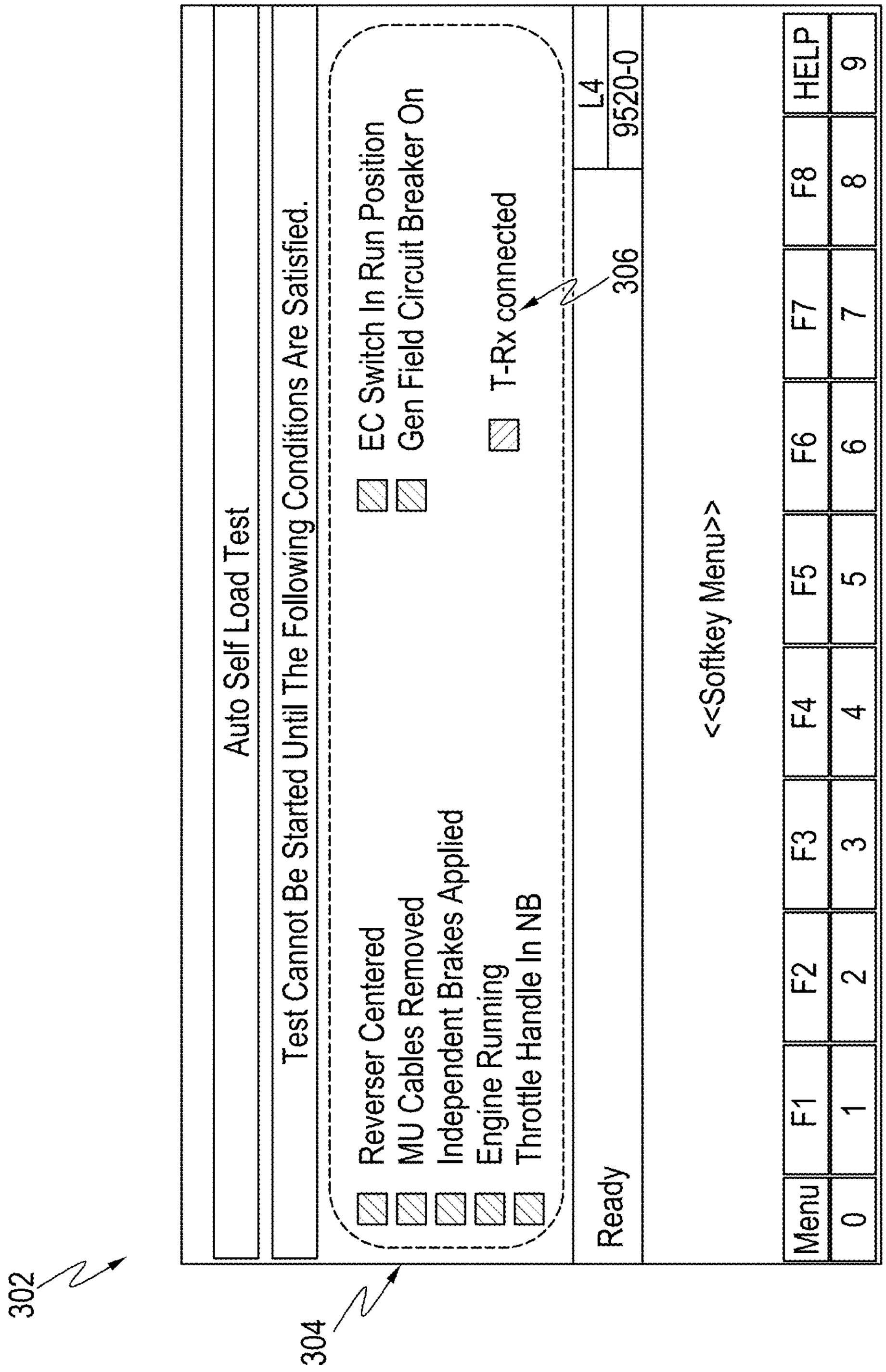
FIG. 3 illustrates a first example of an inspection event setup display screen, in accordance with one example.

In one or more examples, the one or more test preset settings may be based on prerequisite settings of one or more different components and/or systems of the vehicle that may need to be achieved, completed, reached, or the like, before the inspection event may occur. For example, FIG. 3 illustrates one example of a graphical user interface (GUI) setup display screen 302 that may be an inspection event setup display screen. The setup display screen may be displayed to an operator onboard the vehicle, to an operator off-board the vehicle (e.g., an operator off-board the vehicle and positioned proximate to the vehicle), to an operator located at the off-board control system (e.g., positioned a distance away from the vehicle), or the like.

The setup display screen 302 includes a first section of data 304 that includes a list of vehicle settings that may need to be satisfied, reached, and/or completed prior to the start of the inspection event. The list of vehicle settings may be based on the test preset setting(s) that are selected. In the illustrated embodiment, the list includes a position of a reverser, instructions associated with the multiple-unit (MU) cables that extend between two or more vehicles, a brake setting, an operating setting of the engine, a position of a propulsion system throttle handle, a position of a power control switch, a setting of a vehicle circuit breaker. The list of vehicle settings is for illustrative purposes only. In one or more embodiments, the list may include additional prerequisite settings, alternative prerequisite settings, or any combination therein.

In one or more examples, the first section of data may also include a confirmation indicating if an additional sensor system 306 has been connected. In one or more embodiments, the additional sensor system may be a transferable sensor system that is coupled with the vehicle for the inspection event, and then is transferably decoupled from the vehicle upon completion of the inspection event. For example, the transferable sensor system may move between different vehicles during inspection events of the different vehicles. The additional sensor system may be communicatively coupled with the controller 104 (shown in FIG. 1) and/or wirelessly communicatively coupled with the off-board controller 122.

The additional sensor system may include one or more sensors that may detect and/or sense characteristics of components and/or systems of the vehicle, characteristics associated with environmental conditions, or the like, during the inspection event. In one or more embodiments, one or more sensors onboard the vehicle (embedded within the vehicle, non-transferably coupled with the vehicle, or the like) may detect a first set of characteristics, and one or more sensors of the additional sensor system (e.g., that are transferably coupled with the vehicle) may detect a different, second set of characteristics that may be combined with the first set of characteristics to determine a condition of the vehicle or of components and/or systems of the vehicle. For example, the first and second sets of detected characteristics may provide combined data, a partially complete set of data, a complete and/or holistic set of data, or the like, associated with the components and/or systems of the vehicle. In one or more embodiments, the transferable sensors of the additional sensor system may be capable of detecting characteristics that the embedded sensors of the vehicle may be unable to detect.

Figure 4:
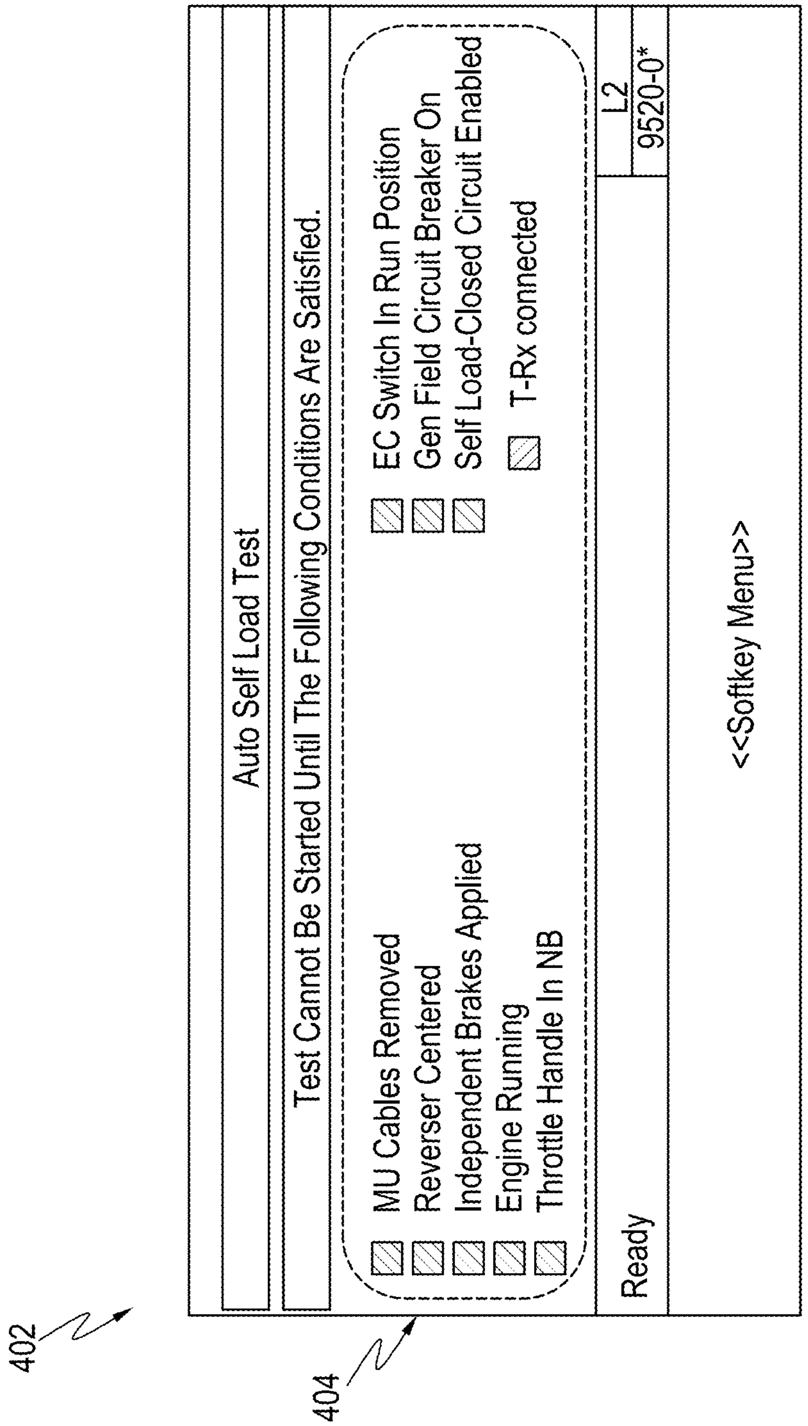
FIG. 4 illustrates a second example of an inspection event setup display screen, in accordance with one example.

In one or more examples, the list of vehicle settings included in the first section of data 304 illustrated in FIG. 3 may be associated with a vehicle that is powered by alternating current (AC). Optionally, the list of vehicle settings that may need to be satisfied may vary for vehicle(s) that are powered by alternative types of energy. For example, FIG. 4 illustrates one example of an inspection event setup display screen 402 that includes a second section of data 404 that may be associated with a vehicle that is powered by direct current (DC). For example, the list of vehicle settings associated with an AC powered vehicle may be different than the list of vehicle settings associated with a DC powered vehicle.

In one or more examples, the controller may automatically change one or more settings of the vehicle to satisfy one or more items from the list of prerequisite settings that need to be completed before the inspection event. For example, if the engine needs to be running to complete the list of preset vehicle settings, the controller may automatically change an operating setting of the vehicle to satisfy the engine running requirement. Optionally, the controller may communicate to an operator of the vehicle to manually change one or more settings to satisfy one or more items from the list of prerequisite settings. For example, the controller may communicate instructions to the operator of the vehicle directing the operator to manually change one or more settings. Optionally, an operator off-board the vehicle (e.g., at the off-board control system) may remotely change one or more settings of the vehicle to satisfy one or more of the prerequisite settings.

Returning to FIG. 2, at step 206, a determination is made if an engine of the vehicle is prepared for the inspection event. For example, the engine may be considered to be prepared for the inspection event if the engine has been operating for a determined length of time, if an engine temperature is at or above a determined temperature level, or the like. If the engine is prepared for the event, flow of the method proceeds toward step 210. Alternatively, if the engine is not prepared for the event, flow of the method proceeds to step 208, and the engine is prepared for the inspection event. In one or more embodiments, in order to prepare the engine for the inspection event, one or more control settings of the vehicle may be changed to control operation of the engine, of thermal management components associated with the engine, or the like. For example, the controller may control a setting of the engine to start operating the engine at a determined engine speed, to change the engine speed, to turn off cooling fans associated with the engine, or the like. The controller may change one or more operating settings of the vehicle until the engine has reached a determined level of preparedness for conducting the inspection event, and flow of the method proceeds toward step 210.

At step 210, responsive to the test preset setting being selected, the list of vehicle settings being satisfied, and the engine being prepared for the inspection event, a control setting of the vehicle is changed to energize a propulsion system component of the propulsion system of the vehicle. As one example, a propulsion system throttle notch setting may be changed to change a propulsion setting of the vehicle. In one or more embodiments, the propulsion system component may be energized at a first level of energization of the propulsion system and the propulsion system may operate at a first propulsion setting for a first length of time. For example, the throttle may be controlled to increase a throttle notch setting, such as to step up the propulsion setting from a notch position of zero to a notch position of one (e.g., a first level of energization). The propulsion system may operate at the first level of energization (e.g., a first propulsion setting) for a first length of time.

In one or more examples, the level(s) of energization of the propulsion system may be based on and/or associated with different amounts and/or ranges of energy supplied to a propulsion system component for the propulsion system component to consume while producing work, such as to control movement of the vehicle system. Optionally, the level(s) of energization of the propulsion system may be based on and/or associated with different amounts and/or ranges of energy that are generated by a component if the form of work. Optionally, the level(s) of energization may be based on and/or associated with different amounts of and/or ranges of energy and/or fuel that is consumed by the component while the component produces work.

In one or more examples, the length of time may be a predetermined length of time. Optionally, the length of time may be based on the controller identifying that the propulsion system has reached a steady state of operation, that the propulsion system has been operating at the steady state of operation for a determined length of time, or the like. As one example, the controller may determine that the first length of time has occurred but that the propulsion system has not yet reached the steady state of operation. The controller may not change a control setting to change the level of energization of a propulsion system component of the propulsion system until the controller determines that the propulsion system has reached the steady state of operation.

At step 212, one or more sensors may obtain and/or detect characteristics of systems and/or components of the vehicle while the propulsion system component of the propulsion system is energized and operating at the first level of energization. In one or more embodiments, the onboard and/or off-board controller may receive the sensed data from the one or more sensors.

In one or more examples, the characteristics of the systems and/or components may include, but are not limited to, engine water inlet and/or outlet temperatures, engine oil inlet and/or outlet temperatures, manifold air temperatures, operating amperes and/or voltage of the vehicle, fuel pressure, a gross horsepower of the propulsion system, a total auxiliary horsepower, engine speed, a length of time of maintaining a throttle notch setting, or the like.

At step 214, a determination is made if the level of energization of the propulsion system component of the propulsion system needs to change. For example, if the propulsion system component was operating at a first level of energization and the level needs to be increased to a second level of energization, flow of the method may return to step 210. At step 210, the component may be controlled to energize the propulsion system component to the next level of energization. At step 212, the sensors may obtain and/or detect characteristics of systems and/or components of the vehicle while the propulsion system component is energized and operating at the second level of energization for a second length of time. For example, the propulsion system may operate at a second level of energization (e.g., a second propulsion setting) for a second length of time.

In one or more embodiments, steps 210 and 212 may continue to be repeated until the propulsion system component of the vehicle is energized to a predetermined level of energization, until the component is energized to a maximum level of energization, or the like. As one example, the vehicle propulsion system may be configured to include eight propulsion throttle notch settings. The steps 210 and 212 may be repeated until the propulsion system has been energized to all eight throttle notch settings, and characteristics of the systems and/or components operating at all of the different throttle notch settings have been obtained.

Optionally, the steps 210 and 212 may be repeated for only a portion of the number of throttle notch settings, for only one of the different throttle notch settings (e.g., the eighth or maximum throttle notch setting), or the like. The number of different levels of energization that the component may be set to may be based on the one or more selected test preset settings, a scheduled time of departure of the vehicle (e.g., the vehicle may only have time to inspect the propulsion system operating at the eighth or maximum throttle setting), historical operating conditions of the vehicle, historical maintenance and/or inspection information associated with the vehicle, anticipated conditions of the vehicle for an upcoming trip of the vehicle, performance conditions of a previous trip or recently completed trip of the vehicle, or the like.

In one or more examples, the steps 210 and 212 may be repeated based on a comparison between the sensed first characteristics of the systems of the vehicle and the sensed second characteristics of the systems of the vehicle. For example, the controller may compare the sensor data obtained while the component of the propulsion system operated at the first level of energization with the sensor data obtained while the component of the propulsion system operated at the second level of energization. If the comparison of the first data (e.g., the first characteristics) and the second data (e.g., the second characteristics) identifies a potential issue, is outside of a determined threshold, is within a determined percentage of a threshold (e.g., within about 5% of a threshold, within about 10% of the threshold, etc.), the controller may determine that additional sensed data may be needed to determine the condition of components and/or systems of the vehicle. For example, steps 210 and 212 may be repeated and the controller may change a control setting of the propulsion system to operate at a third level of energization for a third length of time while third data (e.g., third characteristics) may be obtained.

At step 214, if the level of energization of a component of the propulsion system does not need to be changed, flow of the method proceeds toward step 216. At step 216, a determination is made if a condition of a thermal management system of the vehicle needs to be determined. If a condition of the thermal management system does not need to be determined, flow of the method proceeds toward step 224. Alternatively, if a condition of the thermal management system does need to be determined, flow of the method proceeds toward step 218.

At step 218, operation of one or more thermal management components of the vehicle is controlled. The cooling or thermal management components may include fans, blowers, pumps, valves, or any alternative component that contributes to controlling the thermal management system of the vehicle. For example, one or more fans of the vehicle may be turned to on, or a speed of one or more fans may be controlled to control a thermal energy of the components and/or systems of the vehicle during the inspection event.

At step 220, one or more sensors may monitor a temperature of one or more fluids within the vehicle. The fluid temperatures being monitored may include engine water inlet and/or outlet temperatures, engine oil inlet and/or outlet temperatures, manifold air temperatures, environmental ambient temperatures, or the like. Optionally, the sensors may monitor one or more temperatures of the engine, such as an engine operating temperature, a change in engine operating temperature, a change in the engine operating temperature over a determined length of time, or the like.

In one or more examples, the controller may control operation of the engine at a determined engine speed until a measured engine temperature reaches a determined threshold. Optionally, the controller may control operation of the engine at the determined engine speed for a determined length of time subsequent to the measured temperature reaching the determined threshold. For example, the controller may continue to control operation of the engine at the engine speed for a time after the measured temperature reaches the determined threshold such as to confirm that the engine temperature does not exceed a second threshold, to engine that the engine temperature is substantially maintained at the measured temperature (e.g., within a determined percentage difference), or the like.

Figure 5:
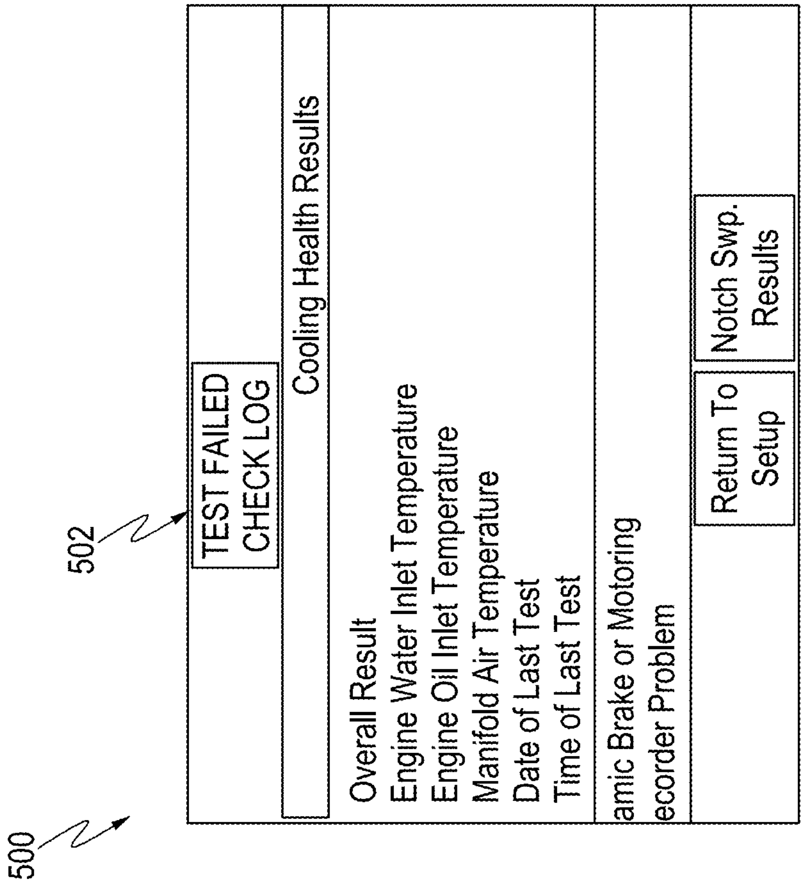
FIG. 5 illustrates an example of a display of results of a first portion of an inspection event, in accordance with one example.

At step 222, a condition of the thermal management system of the vehicle may be determined. FIG. 5 illustrates an example of a display 500 of results of a first portion of an inspection event, in accordance with one example. The first portion of the inspection event may be associated with the inspection of the thermal management system and the determination of the condition of the thermal management system of the vehicle at step 222.

In one or more examples, the temperature of the one or more fluids may be monitored for a length of time, and the condition of the thermal management system may be based at least in part on the temperature of the one or more fluids during the first length of time. Optionally, the condition of the thermal management system may be based on the temperature of the fluids and/or a change in temperature of one or more of the fluids exceeding a designated threshold within the first length of time.

The display 500 may indicate a result 502, such as to an operator of the vehicle, indicating the determined condition of the thermal management system. In the illustrated embodiment, the display indicates that the thermal management system has failed the inspection test. In one or more embodiments, the display may indicate why the test failed, may identify a component and/or system that requires additional testing and/or maintenance, or the like. Optionally, the results may indicate to the operator steps that are to be taken, such as to schedule maintenance and/or repair, to replace a compromised component and/or system, or the like.

Figure 6:
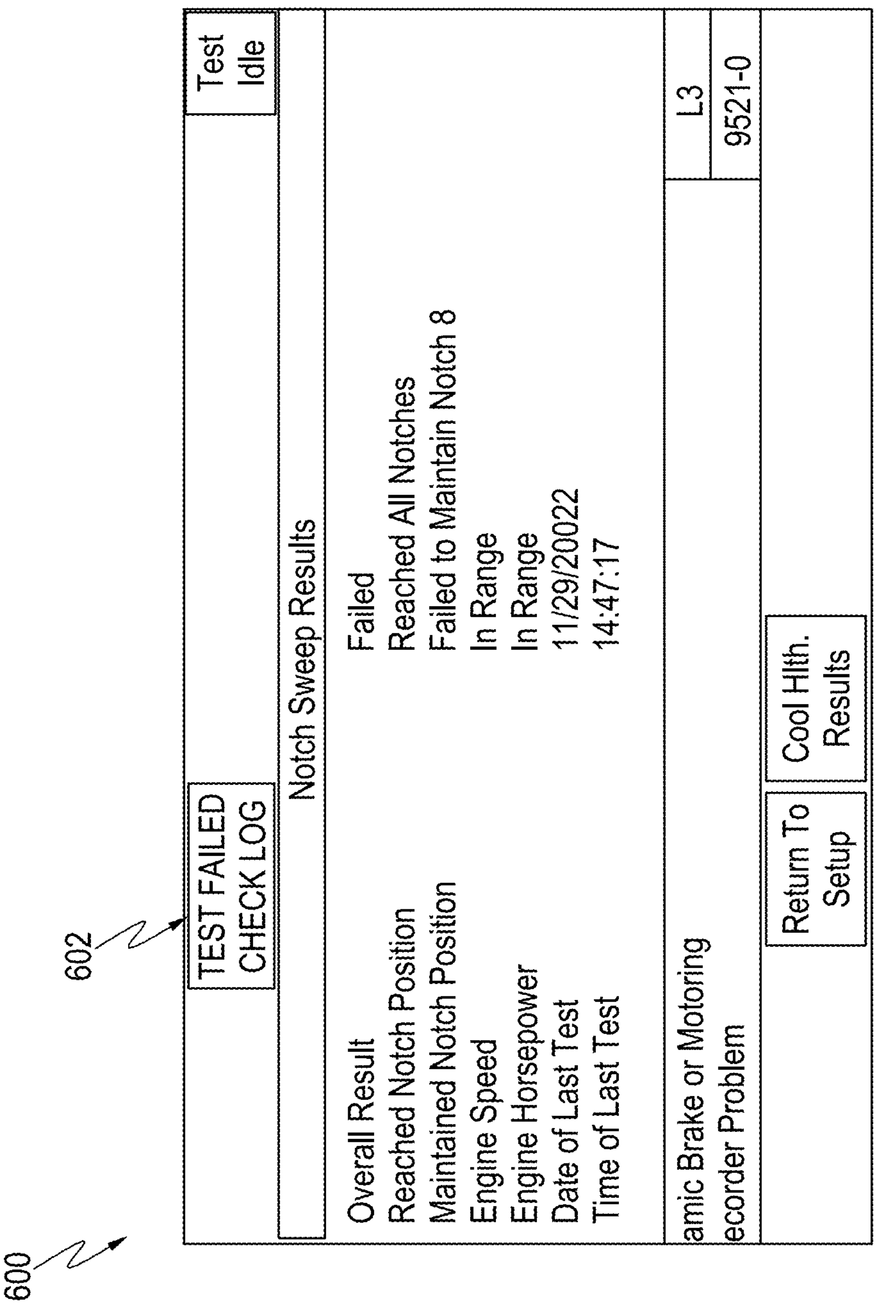
FIG. 6 illustrates an example of a display of results of a second portion of an inspection event, in accordance with one example.

Returning to FIG. 2, subsequent to completion of steps 216 and/or 222, flow of the method proceeds toward step 224. At step 224, a condition and/or operating readiness of the vehicle is determined. FIG. 6 illustrates an example of a display 600 of results of a second portion of the inspection event, in accordance with one example. The second portion of the inspection event may only be associated with the energization of the propulsion system at steps 210 and 212. In one or more embodiments, the second portion may also be associated with the condition of the thermal management system of the vehicle determined at step 222.

In one or more examples, the condition of the component and/or systems may be determined based on the sensed characteristics of the systems and/or components of the vehicle obtained during the inspection event (e.g., during the energization of the propulsion system, during the inspection of the thermal management system, or the like), characteristics previously obtained (e.g., during previous inspection events, during previous operation of the vehicle, or the like), historical characteristics (e.g., data stored within a memory onboard and/or off-board the vehicle), or the like.

In one or more examples, the condition and/or readiness of the vehicle may be based on an overall inspection result review, a comparison of the energization level(s) actually reached verses energization level(s) that should have been reached, a length of time at which different throttle notch settings were held or maintained, an engine speed, an engine horsepower, or the like.

In one or more examples, the condition and/or readiness may be determined and/or based on a comparison of the different data that was obtained during the different levels of energization of the propulsion system. Optionally, the condition may be determined and/or based on a combination of the different data obtained during the different levels of energization. Optionally, the condition may be determined and/or based on a comparison of all or at least some of the obtained data and at least some historical data (e.g., obtained during previous inspection events, obtained during previous operation of the vehicle, or the like).

Optionally, the condition may be determined and/or based on results associated with a determined governing characteristic. For example, the vehicle condition may be determined to be acceptable even if a throttle notch setting was not maintained for a determined length of time but if every level of energization was reached. As another example, the vehicle condition may be determined to be unacceptable if the throttle notch setting was maintained for the determined length of time but if every level of energization was not reached.

The display 600 may indicate a result 602, such as to an operator of the vehicle, indicating the determined condition of the vehicle. In the illustrated embodiment, the display indicates that a component and/or system of the vehicle has failed during the inspection event. In one or more embodiments, the display may indicate why the component and/or system failed, may identify component(s) and/or system(s) that require additional testing and/or maintenance, or the like. Optionally, the results may indicate to the operator steps that could be taken, such as instructions to schedule maintenance and/or repair, directions to replace a compromised component and/or system, or the like. In one or more embodiments, the controller may automatically change an operating mode of the vehicle responsive to determining that at least one component and/or system of the vehicle requires maintenance. For example, the controller may control the propulsion system to change the throttle notch setting to zero, to turn off the engine, to reduce the engine speed, or the like.

Alternatively, the display may indicate that the vehicle has passed the inspection event. For example, the vehicle may be allowed or permitted to depart on a trip responsive to the vehicle passing the inspection event. Optionally, the vehicle may be moved to a storage yard and/or holding location where the vehicle waits to depart on a trip. In one or more embodiments, results of the inspection event may be maintained in a memory or other storage medium, such as to be compared with other sensed characteristics of the vehicle (e.g., subsequent to future trips, subsequent to future inspection events, or the like).

In accordance with one example or aspect of the subject matter described herein, a method of performing an inspection event on a vehicle may include identifying a type of energy used to power one or more components of the vehicle; and from plural different test preset settings, selecting at least one selected setting based at least in part on the type of energy that is identified. One or more control settings of the vehicle may be changed based on the at least one selected setting to energize at least one component of a propulsion system of the vehicle at a first level of energization. One or more first characteristics of one or more systems of the vehicle may be obtained responsive to the energizing of the at least one component at the first level of energization. A condition or operating readiness level of the vehicle may be determined based at least in part on the one or more first characteristics.

Optionally, the one or more first characteristics may include an engine temperature, and the method may include operating an engine of the vehicle at a determined engine speed until a measured engine temperature reaches a determined threshold. Optionally, operation of one or more thermal management components of the vehicle may be controlled responsive to energizing the at least one component at the first level of energization for a first length of time. A temperature of one or more fluids within the vehicle may be monitored during the first length of time. A condition of a thermal management system of the vehicle may be determined based at least in part on the temperature of the one or more fluids within the vehicle. Optionally, a determination if at least one or more systems of the vehicle require maintenance may be made based on the determined condition or operating readiness level of the vehicle. An operating mode of the vehicle may be changed responsive to determining that at least one of the one or more systems of the vehicle requires maintenance. Optionally, a level of energization of the at least one component may be changed from the first level of energization to a second level of energization responsive to the propulsion system operating at the first level of energization for a first length of time. Optionally, the at least one component may be energized at the second level of energization for a second length of time. One or more second characteristics of the one or more systems may be obtained in response to the energizing of the at least one component at the second level of energization. The one or more first characteristics may be compared with the one or more second characteristics. The condition or the operating readiness level of the vehicle may be determined based at least in part on the comparison between the one or more first characteristics and the one or more second characteristics. Optionally, energizing the at least one component at the first level of energization may include operating the propulsion system of the vehicle at a first propulsion setting, and energizing the at least one component at the second level of energization may include operating the propulsion system at a second propulsion setting. Optionally, the first length of time may be based on the propulsion system reaching a steady state of operation.

Optionally, the at least one component may be energized at a second level of energization for a second length of time. One or more second characteristics of the one or more systems may be obtained in response to energizing the at least one component at the second level of energization for the second length of time. The at least one component may be energized at a third level of energization for a third length of time responsive to determining that a difference between the one or more first characteristics and the one or more second characteristics is within a determined threshold. Optionally, the condition or the operating readiness level of the vehicle may be determined at one or more events of: prior to the vehicle embarking on trip, during the trip, or after completion of the trip. Optionally, one or more sensors may be transferably coupled with the vehicle during the inspection event on the vehicle.

In accordance with one example or aspect of the subject matter described herein, a control system may perform an inspection event on a vehicle. The control system may include a controller having one or more processors that identify a type of energy used to power one or more components of a vehicle. The controller may select at least one selected setting from among plural test preset settings based at least in part on the type of energy that is identified. The controller may change one or more control settings of the vehicle based on the at least one selected setting to energize at least one propulsion system component of a propulsion system of the vehicle at a first level of energization. The controller may obtain one or more first characteristics of one or more systems in response to the energizing of the at least one propulsion system component at the first level of energization. The controller may determine a condition or operating readiness level of the vehicle based at least in part on the one or more first characteristics.

Optionally, the one or more first characteristics may include an engine temperature. The controller may control operation of an engine at a determined engine speed until a measured engine temperature reaches a determined threshold. Optionally, the controller may control operation of the engine at the determined engine speed for a determined length of time subsequent to the measured engine temperature reaching the determined threshold. Optionally, the controller may control operation of one or more thermal management components of the vehicle responsive to energizing the at least one propulsion system component at the first level of energization for a first length of time. The controller may monitor a temperature of one or more fluids within the vehicle during the first length of time. The controller may determine a condition of a thermal management system of the vehicle based at least in part on the temperature of the one or more fluids within the vehicle during the first length of time. Optionally, the controller may determine the condition of the thermal management system based on one or more of the temperature of the one or more fluids, a change in temperature of the one or more fluids, or a change in temperature of the one or more fluids within a determined time range exceeding a designated threshold.

Optionally, the vehicle may be one or more of an electric vehicle, a non-electric vehicle, or a hybrid electric and non-electric vehicle. Optionally, the controller may change a level of energization of the at least one propulsion system component from the first level of energization to a second level of energization. The controller may energize the at least one propulsion system component at the second level of energization for a second length of time and obtain one or more second characteristics of the one or more systems of the vehicle during energization of the at least one propulsion system component at the second level of energization. Optionally, the controller may compare the one or more first characteristics with the one or more second characteristics and determine the condition or operating readiness level of the vehicle based at least in part on the comparison between the one or more first characteristics and the one or more second characteristics. Optionally, the controller may determine the condition of the vehicle at least one or more events of: prior to the vehicle embarking on a trip, during the trip, or after completion of the trip. Optionally, the control system may include one or more sensors that may be transferably coupled with the vehicle during the inspection event on the vehicle. The controller may receive the one or more first characteristics from the one or more sensors. Optionally, the controller may determine that the inspection event is required based at least in part on a time of completion of a previous inspection event on the vehicle. Optionally, the controller may select the at least one selected setting based at least in part on a time of departure of the vehicle on a trip.

In accordance with one example or aspect of the subject matter described herein, a method may include identifying a type of energy used to power one or more components of a vehicle. From among plural test preset settings, at least one selected setting may be selected based at least in part on the type of energy that is identified. One or more control settings of the vehicle may be changed based on the at least one selected setting to energize at least one propulsion system component of a propulsion system of the vehicle to a first level of energization. An engine temperature of an engine of the vehicle may be obtained in response to energizing the at least one propulsion system component. The engine temperature may be determined to be below a determined threshold. The one or more control settings of the vehicle may be changed to energize the at least one propulsion system component to a second level of energization until the engine temperature reaches the determined threshold responsive to determining that the engine temperature is below the determined threshold. The propulsion system may be operated at a first propulsion setting responsive to the engine temperature reaching the determined threshold. The propulsion system may operate at the first propulsion setting for a first length of time. One or more characteristics of one or more systems of the vehicle may be obtained during operation of the propulsion system at the first propulsion setting. A condition or an operating readiness level of the vehicle may be determined based at least in part on the one or more characteristics.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method of performing an inspection event on a vehicle, comprising:

identifying a type of energy used to power one or more components of a vehicle;

from plural different test preset settings, selecting at least one selected setting based at least in part on the type of energy that is identified;

changing one or more control settings of the vehicle based on the at least one selected setting to energize at least one component of a propulsion system of the vehicle at a first level of energization;

obtaining one or more first characteristics of one or more systems of the vehicle responsive to the energizing of the at least one component at the first level of energization; and determining a condition or operating readiness level of the vehicle based at least in part on the one or more first characteristics.

2. The method of claim 1, wherein the one or more first characteristics includes an engine temperature, the method further comprising:

operating an engine of the vehicle at a determined engine speed until a measured engine temperature reaches a determined threshold.

3. The method of claim 1, further comprising:

controlling operation of one or more thermal management components of the vehicle responsive to energizing the at least one component at the first level of energization for a first length of time;

monitoring a temperature of one or more fluids within the vehicle during the first length of time; and determining a condition of a thermal management system of the vehicle based at least in part on the temperature of the one or more fluids within the vehicle.

4. The method of claim 1, further comprising:

determining if at least one of the one or more systems of the vehicle requires maintenance based on the determined condition or operating readiness level of the vehicle; and changing an operating mode of the vehicle responsive to determining that at least one of the one or more systems of the vehicle requires maintenance.

5. The method of claim 1, further comprising changing a level of energization of the at least one component from the first level of energization to a second level of energization responsive to the propulsion system operating at the first level of energization for a first length of time.

6. The method of claim 5, further comprising:

energizing the at least one component at the second level of energization for a second length of time;

obtaining one or more second characteristics of the one or more systems in response to the energizing of the at least one component at the second level of energization;

comparing the one or more first characteristics with the one or more second characteristics; and determining the condition or the operating readiness level of the vehicle based at least in part on the comparison between the one or more first characteristics and the one or more second characteristics.

7. The method of claim 5, wherein energizing the at least one component at the first level of energization includes operating the propulsion system of the vehicle at a first propulsion setting and energizing the at least one component at the second level of energization includes operating the propulsion system at a second propulsion setting.

8. The method of claim 5, wherein the first length of time is based on the propulsion system reaching a steady state of operation.

9. The method of claim 1, further comprising:

energizing the at least one component at a second level of energization for a second length of time;

obtaining one or more second characteristics of the one or more systems in response to energizing the at least one component at the second level of energization for the second length of time;

energizing the at least one component at a third level of energization for a third length of time responsive to determining that a difference between the one or more first characteristics and the one or more second characteristics is within a determined threshold.

10. The method of claim 1, further comprising determining the condition or the operating readiness level of the vehicle at one or more events of: prior to the vehicle embarking on a trip, during the trip, or after completion the trip.

11. The method of claim 1, further comprising transferably coupling one or more sensors with the vehicle during the inspection event on the vehicle.

12. A control system configured to perform an inspection event on a vehicle, the control system comprising:

a controller having one or more processors configured to identify a type of energy used to power one or more components of a vehicle, the controller configured to select at least one selected setting from among plural test preset settings based at least in part on the type of energy that is identified, the controller configured to change one or more control settings of the vehicle based on the at least one selected setting to energize at least one propulsion system component of a propulsion system of the vehicle at a first level of energization, the controller configured to obtain one or more first characteristics of one or more systems in response to the energizing of the at least one propulsion system component at the first level of energization, and the controller configured to determine a condition or operating readiness level of the vehicle based at least in part on the one or more first characteristics.

13. The control system of claim 12, wherein the one or more first characteristics includes an engine temperature, wherein the controller is configured to control operation of an engine at a determined engine speed until a measured engine temperature reaches a determined threshold.

14. The control system of claim 13, wherein the controller is configured to control operation of the engine at the determined engine speed for a determined length of time subsequent to the measured engine temperature reaching the determined threshold.

15. The control system of claim 12, wherein the controller is configured to control operation of one or more thermal management components of the vehicle responsive to energizing the at least one propulsion system component at the first level of energization for a first length of time, the controller configured to monitor a temperature of one or more fluids within the vehicle during the first length of time, and the controller configured to determine a condition of a thermal management system of the vehicle based at least in part on the temperature of the one or more fluids within the vehicle during the first length of time.

16. The control system of claim 15, wherein the controller is configured to determine the condition of the thermal management system based on one or more of the temperature of the one or more fluids, a change in temperature of the one or more fluids, or a change in temperature of the one or more fluids within a determined time range exceeding a designated threshold.

17. The control system of claim 12, wherein the vehicle is one or more of an electric vehicle, a non-electric vehicle, or a hybrid electric and non-electric vehicle.

18. The control system of claim 12, wherein the controller is configured to change a level of energization of the at least one propulsion system component from the first level of energization to a second level of energization, the controller configured to energize the at least one propulsion system component at the second level of energization for a second length of time and obtain one or more second characteristics of the one or more systems of the vehicle during energization of the at least one propulsion system component at the second level of energization.

19. The control system of claim 18, wherein the controller is configured to compare the one or more first characteristics with the one or more second characteristics and determine the condition or operating readiness level of the vehicle based at least in part on the comparison between the one or more first characteristics and the one or more second characteristics.

20. The control system of claim 12, wherein the controller is configured to determine the condition of the vehicle at one or more events of: prior to the vehicle embarking on a trip, during the trip, or after completion of the trip.

21. The control system of claim 12, further comprising one or more sensors configured to be transferably coupled with the vehicle during the inspection event on the vehicle, wherein the controller is configured to receive the one or more first characteristics from the one or more sensors.

22. The control system of claim 12, wherein the controller is configured to determine that the inspection event is required based at least in part on a time of completion of a previous inspection event on the vehicle.

23. The control system of claim 12, wherein the controller is configured to select the at least one selected setting based at least in part on a time of departure of the vehicle on a trip.

24. A method, comprising:

identifying of a type of energy used to power one or more components of a vehicle;

from among plural test preset settings, selecting at least one selected setting based at least in part on the type of energy that is identified;

changing one or more control settings of the vehicle based on the at least one selected setting to energize at least one propulsion system component of a propulsion system of the vehicle to a first level of energization;

obtaining an engine temperature of an engine of the vehicle in response to energizing the at least one propulsion system component;

determining that the engine temperature is below a determined threshold;

changing the one or more control settings of the vehicle to energize the at least one propulsion system component to a second level of energization until the engine temperature reaches the determined threshold responsive to determining that the engine temperature is below the determined threshold;

operating the propulsion system at a first propulsion setting responsive to the engine temperature reaching the determined threshold, the propulsion system configured to operate at the first propulsion setting for a first length of time;

obtaining one or more characteristics of one or more systems of the vehicle during operation of the propulsion system at the first propulsion setting; and determining a condition or an operating readiness level of the vehicle based at least in part on the one or more characteristics.

* * * * *